May 2, 1961 J. W. HURLEY 2,982,512
VALVE
Filed July 3, 1957

INVENTOR.
JOSEPH W. HURLEY
BY Clarence R. Patty, Jr.
ATTORNEY

2,982,512
VALVE

Joseph W. Hurley, Corning, N.Y., assignor to Corning Glass Works, Corning, N.Y., a corporation of New York Filed July 3, 1957, Ser. No. 669,793

2 Claims. (Cl. 251—77)

The present invention relates to valves of a type especially suitable for use in a glass piping network such for example as employed in chemical plants for conducting corrosive liquids. The invention embodies a glass housing conveniently comprising a coupling having end shapes characteristic of those of the pipe and pipe fittings with which the valve is to be used.

According to the invention the coupling embodies a main passageway and an angularly positioned bore in communication therewith. The main passageway has a bordering seat therein available to a plug occupying and axially movable in the coupling bore to engage such seat. The plug is axially movable by a rotatable but axially fixed plug actuating spindle which in part occupies a cavity in the plug. A plug spring is compressed following engagement of the plug with its seat to resiliently maintain the valve seated.

For a full understanding of the invention reference is made to the accompanying drawing in which.

Figure 1:
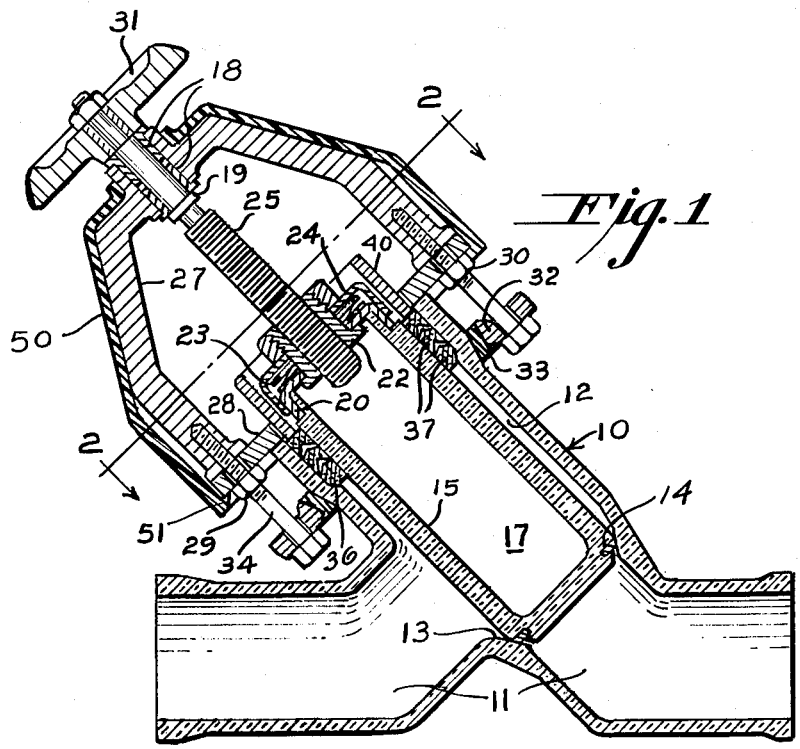
Fig. 1 is a sectional elevation of a valve and coupling embodying the invention.

Referring to the drawing in detail, there is provided a coupling 10 having a main passageway 11 and an angularly positioned bore 12 communicating therewith and axially aligned with one region thereof. In such region of the main passageway a surrounding seat 13 is adapted to be engaged by a plug ring 14 of an elastic corrosion resistant plastic material carried in a suitable groove about the unsupported end of a plug 15 occupying bore 12 and projectable into engagement with such seat. The plug 15 is hollow and open at its supported end, which is of a reduced outer diameter and closed by a collar 20 fitting thereover and adhesively attached thereto.

An internally threaded member or tubular bolt 22, passes through collar 20 holds a surrounding spring 23 partly compressed between the collar and a plastic cover 24 slidably overlapping the periphery of the collar. Bolt 22 is internally threaded to a plug actuating spindle 25 rotatably mounted in a yoke 27. The spindle 25 is rotatable in bearings 18 in yoke 27 wherein it is held against axial movement between a stop 19 and a valve operating wheel 31.

The yoke 27 is clamped to the coupling 10 by cap screws such as 34 through the medium of a base plate 28 and a conventional clamping flange 32 having the usual packing 33 between it and the coupling wall. Nuts 29 and 30 threaded on such cap screws further directly clamp the yoke 27 to the base plate 28.

Figure 2:
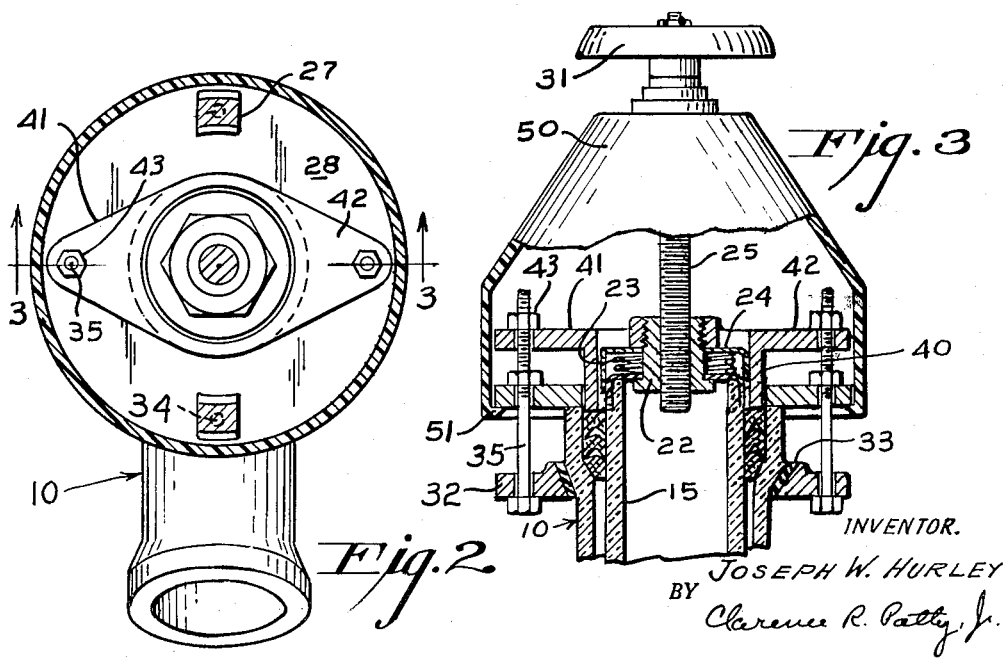
Fig. 2 is a sectional view taken on line 2—2 of Fig. 1.
Figure 3:
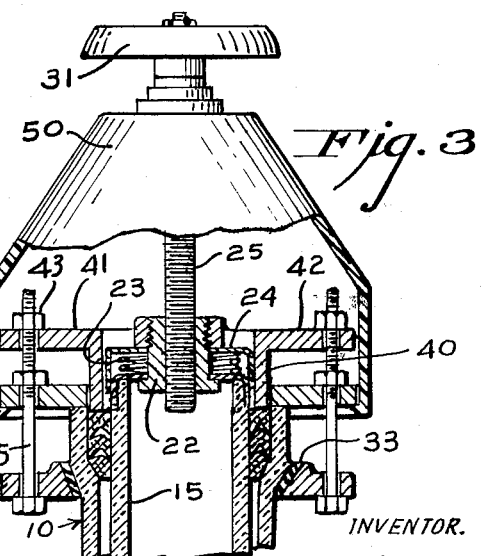
Fig. 3 is a view of a fragment of the valve and coupling, shown partly in section along line 3—3 of Fig. 2.

As will be observed, the wall of the coupling 10 about bore 12, as outwardly offset, provides a tapered ledge 36 for accommodating a number of packing rings 37 within the bore 12 about plug 15. Rings 37 are adapted to be compressed against ledge 36 and about the surrounded wall region of plug 15 by means of a gland follower 40 which has flange extensions 41 and 42 (Figs. 2 and 3) provided with apertures occupied by the bolts such as 35 also employed in clamping the base plate 28 to the clamping flange 32. Nuts such as 43 are threaded on such bolts against flange extensions 41 and 42 until the packing rings present a fluid tight seal as well as substantial circumferential friction between the surrounding wall of coupling 10 and the plug 15.

A cover 50 of plastic material is arranged over the yoke 27 and has an internal flange 51 adapted to snap under the border edge of the base plate 28, thus providing a protective cover over the valve parts bridged by the yoke.

As will be observed, when the wheel 31 is rotated to turn spindle 25 the plug 15 will be axially moved, since the friction of the packing rings 37 with the plug 15 and the surrounding bore wall greatly exceeds the turning force imparted to the plug through the spindle threads. Also, as will be seen, the plug cavity 17 is telescoped over the spindle 25 as the plug is moved away from its seat 13. When the valve is being closed a tight fit between the plug ring 14 and seat 13 is assured jointly by the resiliency of the ring and the plug spring 23, since after ring 14 is bottomed on seat 13 wheel 31 can be turned further to place the plug under the compressive force of the plug spring.

What is claimed is:

1. A valve for controlling the flow of fluid through a coupling forming a part thereof, said coupling being provided with a main passageway and an angularly positioned bore communicating therewith, a plug within said bore, said coupling having formed within its wall a plug seat surrounding such main passageway, the wall of such coupling being outwardly offset to provide inner and outer circumferential ledges thereabout surrounding such bore, a packing ring against such inner ledge and about the perimeter of said plug to effect a seal therebetween and to apply circumferential friction against free turning movement of the plug; a base plate having associated means cooperative with the outer of such ledges fixing it to said coupling, having a passage therethrough in register with the coupling bore occupied by said plug; a yoke, having associated means fixing it to said base plate, bridging its bore; a collar attached to the end of the plug opposite that engageable with its seat, an annular compression spring adjacent to said collar, an internally threaded tubular clamping member passing through said collar and compression spring to resiliently hold them clamped to one another, a plug actuating stem threaded through said member and having an unthreaded portion passing through said yoke, and means for preventing axial movement of said stem with respect to said yoke when the stem is rotated to effect axial movement of said plug.

2. A valve assembly comprising a body having a flow passage therethrough, a seat in said flow passage, a plug in said body engageable with said seat, an internally threaded clamping member carried by said plug, a stem threaded through said clamping member to axially move the plug with respect to its seat, means on said body associated with said stem providing for only rotational movement thereof, means between said plug and said body for frictionally holding the plug against rotation with the stem, a collar adhesively attached to said plug, said collar being slidably supported by said clamping member, a cover supported on and attached to said clamping member, and a compression spring between the collar and said cover to resiliently couple said plug and stem together, whereby a limited turning movement of the stem is provided by further compression of said spring after the plug engages its seat.

(References on following page)

References Cited in the file of this patent

UNITED STATES PATENTS

| | | |
|---|---|---|
| 1,712,298 | Ford | May 7, 1929 |
| 1,841,789 | Connolly | Jan. 19, 1932 |
| 1,865,670 | Boyce | July 5, 1932 |
| 2,049,204 | Jacobsen | July 28, 1936 |
| 2,331,557 | Lorehn et al. | Oct. 12, 1943 |
| 2,573,623 | Stover | Oct. 30, 1951 |
| 2,578,628 | Hartman | Dec. 11, 1951 |
| 2,707,968 | Efford | May 10, 1955 |

FOREIGN PATENTS

| | | |
|---|---|---|
| 127,497 | Great Britain | June 5, 1919 |